United States Patent
Zhao et al.

(10) Patent No.: US 7,636,787 B2
(45) Date of Patent: Dec. 22, 2009

(54) PARSER FOR PARSING TEXT-CODED PROTOCOL

(75) Inventors: Baohua Zhao, Anhui (CN); Yugui Qu, Anhui (CN); Hao Zhou, Anhui (CN); Ye Tian, Anhui (CN); Shuo Wang, Anhui (CN); Qiyue Li, Anhui (CN); Chao Lv, Anhui (CN); Zhiwei Jin, Guangdong (CN)

(73) Assignees: Huawei Technologies Co., LTD., Shenzhen (CN); University of Science and Technology of China, Anhui (CN)

( * ) Notice: Subject to any disclaimer, the term of this patent is extended or adjusted under 35 U.S.C. 154(b) by 272 days.

(21) Appl. No.: 11/878,191

(22) Filed: Jul. 23, 2007

(65) Prior Publication Data

US 2008/0040496 A1 Feb. 14, 2008

Related U.S. Application Data (63) Continuation of application No. PCT/CN2006/000118, filed on Jan. 23, 2006.

(30) Foreign Application Priority Data

Jan. 21, 2005 (CN) .................... 2005 1 0001782

(51) Int. Cl.
*G06F 15/16* (2006.01)

(52) U.S. Cl. ..................... 709/230; 717/143

(58) Field of Classification Search ............ 717/143
See application file for complete search history.

(56) References Cited

U.S. PATENT DOCUMENTS

| 5,916,305 | A  | * | 6/1999  | Sikdar et al.      | 709/236 |
|-----------|----|---|---------|--------------------|---------|
| 7,187,694 | B1 | * | 3/2007  | Liao               | 370/474 |
| 7,293,113 | B1 | * | 11/2007 | Krishna et al.     | 709/250 |
| 2003/0036898 | A1 | * | 2/2003 | Duan et al.       | 704/2   |
| 2003/0185220 | A1 | * | 10/2003 | Valenci          | 370/398 |
| 2004/0088425 | A1 | * | 5/2004  | Rubinstein et al. | 709/230 |
| 2005/0050308 | A1 | * | 3/2005  | Zatloukal et al.  | 712/236 |
| 2005/0091588 | A1 | * | 4/2005  | Ramarao et al.    | 715/522 |
| 2006/0280178 | A1 | * | 12/2006 | Miller et al.     | 370/389 |

FOREIGN PATENT DOCUMENTS

| CN | 1533093 A       |   | 9/2004 |
|----|-----------------|---|--------|
| EP | 1 420 548 A2    |   | 5/2004 |
| JP | 2002-16662 A    |   | 1/2002 |
| JP | 2003-163712 A   |   | 6/2003 |
| WO | 2004-061651 A2  |   | 7/2004 |
| WO | WO 2004061651   | * | 7/2004 |

* cited by examiner

*Primary Examiner*—Quang N. Nguyen
*Assistant Examiner*—Kostas Katsikis
(74) *Attorney, Agent, or Firm*—Conley Rose, P. C.; Grant Rodolph (57) ABSTRACT

A parser for parsing a text-coded protocol includes: a parsing rule storage module, configured to store a parsing rule for parsing a packet of the text-coded protocol; and a packet parsing module, implemented by a logic chip, configured to parse the packet according to the parsing rule stored in the parsing rule storage module, and output a parsing result. Compared with software-based parsers, the hardware-based parser provided by embodiments of the present invention improves parsing efficiency and reduces cost of the parser. In addition, the parser provided by embodiments of the present invention has a better generality.

10 Claims, 5 Drawing Sheets

PARSER FOR PARSING TEXT-CODED PROTOCOL

CROSS REFERENCE TO RELATED APPLICATIONS

This application is a continuation of PCT Application Serial No. PCT/CN2006/00118 filed Jan. 23, 2006 and entitled "A Text Coding Type Protocol Parser," which claims priority to Chinese Patent Application 200510001782.1 filed Jan. 21, 2005 and which is incorporated herein by reference in its entirety.

FIELD OF THE INVENTION

The present invention relates to network communication technologies, and more particularly, to a parser for parsing a text-coded protocol.

BACKGROUND OF THE INVENTION

Internet Engineering Task Force (IETF) defines packet formats for multiple protocols, such as Session Initial Protocol (SIP) by an Augmented Backus-Naur Form (ABNF). When implementing the protocols, packets are required to be parsed according to their ABNF specifications.

The ABNF is a format syntax defined by the IETF in RFC2234. The ABNF is a modified version of Backus-Naur Form (BNF). The difference between the ABNF and the BNF includes: naming rules, repetition, alternatives, order-independence and value ranges.

At present, an ABNF parser is usually implemented on a universal micro-processor by software to perform a morphology and syntax parsing algorithm, e.g., an LL (1) syntax parsing algorithm within a compiling principle domain. The LL (1) syntax parsing algorithm is a superincumbent non-recursive prediction analyzer. The LL (1) syntax parsing algorithm constructs a prediction analyzing table of the syntax by computing a First Terminals Set and a Follow Terminals Set of the syntax, so as to make a deduction according to the prediction analyzing table. The LL (1) syntax is an unambiguous syntax without left recursion. The first "L" of the LL (1) represents to scan an input string from left to right; the second "L" represents to generate a most left deduction; "1" represents to refer to one input symbol forward when determining each action of the ABNF parser.

Because the ABNF is a text-coded syntax definition, the complexity for the ABNF parser to parse a string with a variable-length is higher than that to parse binary data with a fixed-length. The advantage of the ABNF parser is that, the ABNF parser may be implemented with a lower cost and a higher efficiency. However, the universal micro-processor is not specifically designed for the ABNF parser. Therefore, processing speed, throughput and other performance parameters of the micro-processor are often limited. When a higher processing speed is required, for example, when an SIP softswitch system needs to handle millions of connections, it is necessary to use a higher-level micro-processor. Thus, the cost of the ABNF parser is increased inevitably.

There exists another kind of ABNF parser which is also implemented on the universal micro-processor. For this kind of ABNF parser, specific software is designed in respect of features of an ABNF syntax rule within a specific domain. For example, as to the SIP, a usual implementation is to segment an SIP packet into several fields by a segmentation identifier according to the feature of the SIP syntax rule; then perform corresponding syntax rule check.

The second kind of ABNF parser is designed for a specific syntax rule, thus the efficiency is higher than that of the first kind of ABNF parser described above. However, the specific design of the second kind of ABNF parser also leads to a poor generality. As to a new syntax rule, the ABNF parser must be redesigned. Thus, the cost for developing the ABNF parser is increased and the developing efficiency is lowered. On the other hand, because the second kind of ABNF parser is still designed based on the universal micro-processor, the problem described in respect of the first kind of ABNF parser still exists when the high processing speed is required.

SUMMARY OF THE INVENTION

Embodiments of the present invention provide a parser for parsing a text-coded protocol to improve parsing efficiency and increase generality of the parser.

According to an embodiment of the present invention, a parser for parsing a text-coded protocol includes:

a parsing rule storage module, configured to store a parsing rule for parsing a packet of the text-coded protocol;

a packet parsing module, implemented by a logic chip, configured to parse the packet according to the parsing rule stored in the parsing rule storage module, and output a parsing result.

The parser provided by the embodiments of the present invention is implemented based on a hardware logic chip. Compared with the software-based parsers, the hardware-based parser provided by embodiments of the present invention improves the parsing efficiency and reduces the developing cost of the parser. In addition, the parser provided by embodiments of the present invention parses the packet according to the parsing rule stored, therefore has a better generality.

DETAILED DESCRIPTION OF THE INVENTION

The present invention is hereinafter described in detail with reference to accompanying drawings and embodiments.

In embodiments of the present invention, the parser is implemented based on a hardware logic chip, which improves the parsing efficiency of the parser, lowers the cost of the parser and provides the parser with a better generality.

An embodiment is hereinafter given to further describe the present invention.

Figure 1:
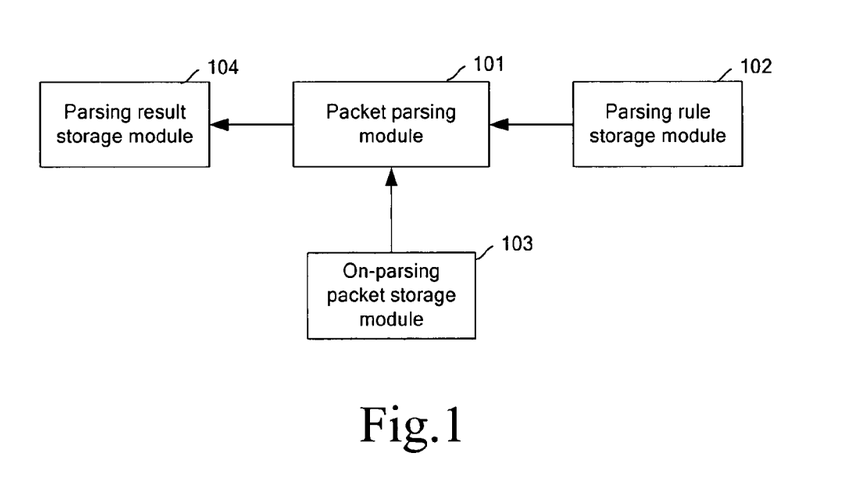
FIG. 1 is a schematic diagram illustrating a structure of a parser according to an embodiment of the present invention.

FIG. 1 is a schematic diagram illustrating a structure of the parser according to an embodiment of the present invention. The parser includes: a packet parsing module 101, a parsing rule storage module 102, an on-parsing packet storage module 103 and a parsing result storage module 104.

The parsing rule storage module 102 stores a rule-tree generated based on ABNF rules, wherein value of the rule-tree has not been assigned. Nodes of the rule-tree are generally stored in order to enable the packet parsing module 101 to read all the nodes of the rule-tree at one time.

In this embodiment, the rule-tree stored in the parsing rule storage module 102 may be generated based on the ABNF rules according to the following methods.

(1) Simplify each ABNF rule, i.e., simplify the description of the ABNF rule, so that the ABNF rule includes no complex structure such as incremental alternative, sequence group and optional sequence. The simplified ABNF rule may be stored in a rule table. Each entry of the rule table corresponds to one simplified ABNF rule. The detailed process of the simplification includes:

for each ABNF rule, add one entry in the rule table (e.g., a Hash table);

for the ABNF rule including an incremental alternative, add content of the incremental alternative to the ABNF rule, and update the entries of the rule table;

for the ABNF rule including a sequence group, define the content of the sequence group as a new ABNF rule, replace the content of the sequence group of the original ABNF rule with the new ABNF rule, and repeat such a procedure until the new ABNF rule includes no sequence group;

for the ABNF rule including an optional sequence, define the content of the optional sequence as a new ABNF rule, replace the content of the optional sequence of the original ABNF rule with the new ABNF rule, and repeat such a procedure until the new ABNF rule includes no optional sequence.

(2) Generate the rule-tree based on the rule table. Specifically, select a rule in the rule table as a root node, and recursively generate the corresponding rule-tree based on the root node. Each node of the rule-tree stores a maximum number of matching time defined by the ABNF.

(3) Compute a First Terminals Set and a Follow Terminals Set for each node of the rule-tree according to the LL(1) algorithm, and store a First Terminals Set list and a Follow Terminals Set list.

The packet stored in the on-parsing packet storage module 103 may be orderly stored in form of byte.

The packet parsing module 101 reads a string of the packet from the on-parsing packet storage module 103, obtains the rule-tree from the parsing rule storage module 102, assigns value for the rule-tree with the string of the packet, i.e. parsing the packet, to generate a rule-tree assigned with value, and outputs the rule-tree assigned with value as a parsing result to the parsing result storage module 104 for storage.

This embodiment is based on the ABNF parser and performs the parsing using the ABNF rules, and is applicable to various ABNF-based occasions, e.g., the SIP and Extensible Markup Language (XML). Thus, this embodiment has a better generality.

The packet parsing module 101 functioning as a core portion in this embodiment may be implemented by a Field Programmable Gate Array (FPGA) or a Complex Programmable Logical Device (CPLD). The implementation of the packet parsing module 101 is hereinafter described in detail.

Figure 2:
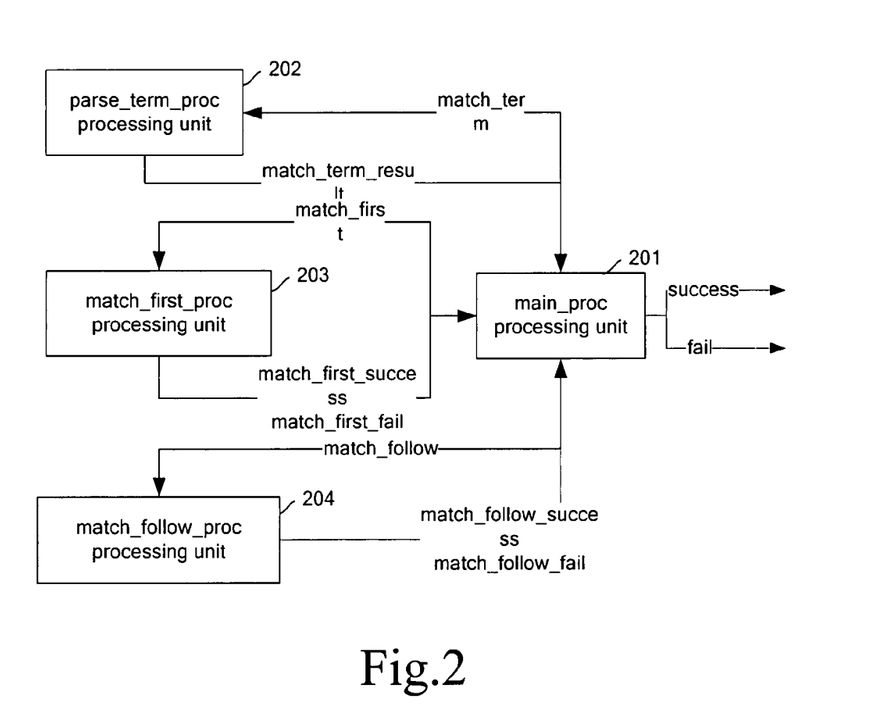
FIG. 2 is schematic diagram illustrating an internal structure and implementation principle of a packet parsing module 101 of the parser shown in FIG. 1.

FIG. 2 is a schematic diagram illustrating an internal structure and implementation principle of the packet parsing module 101 of the parser shown in FIG. 1. The packet parsing module 101 in this embodiment includes four units: a main_proc processing unit 201, three sub_proc processing units including a parse_term_proc processing unit 202, a match_first_proc processing unit 203 and a match_follow_proc processing unit 204. The four units of the packet parsing module 101 are respectively implemented by state machines.

The main_proc processing unit 201 manages initiations of the parse_term_proc processing unit 202, the match_first_proc processing unit 203 and the match_follow_proc processing unit 204 to perform relevant functions of them.

The main_proc processing unit 201 starts upon an external parsing control signal. When a condition for initiating a certain sub_proc processing unit is met, the state machine of the main_proc processing unit 201 transfer to a state corresponding to the sub_proc processing unit and sends a signal to the sub_proc processing unit to initiate the sub_proc processing unit. After the processing of the sub_proc processing unit is completed, the sub-process processing unit returns a processing result to the main_proc processing unit 201. The main_proc processing unit 201 outputs a success or failure signal as the parsing result to an external network.

The parse_term_proc processing unit 202 is configured to be started under control of the main_proc processing unit 201 if a top node of a stack is a terminative node, and inform the main_proc processing unit 201 after parsing the terminative node.

The match_first_proc processing unit 203 is configured to be started under the control of the main_proc processing module 201 if the top node of the stack is a non-terminative node and belongs to a First Terminals Set, and inform the main_proc processing unit 201 after determine whether a current character belongs to the First Terminals Set by matching the current character with all characters of the First Terminals Set.

The match_follow_proc processing unit 204 is configured to be started under the control of the main_proc processing unit 201 if the top node of the stack is a non-terminative node and belongs to a Follow Terminals Set, and inform the main_proc processing unit 201 after determine whether the current character belongs to the Follow Terminals Set by matching the current character with all characters of the Follow Terminals Set.

The states and detailed processing of the main_proc processing unit 201 and the three sub_proc processing units 202~204 are hereinafter described respectively.

Figure 3:
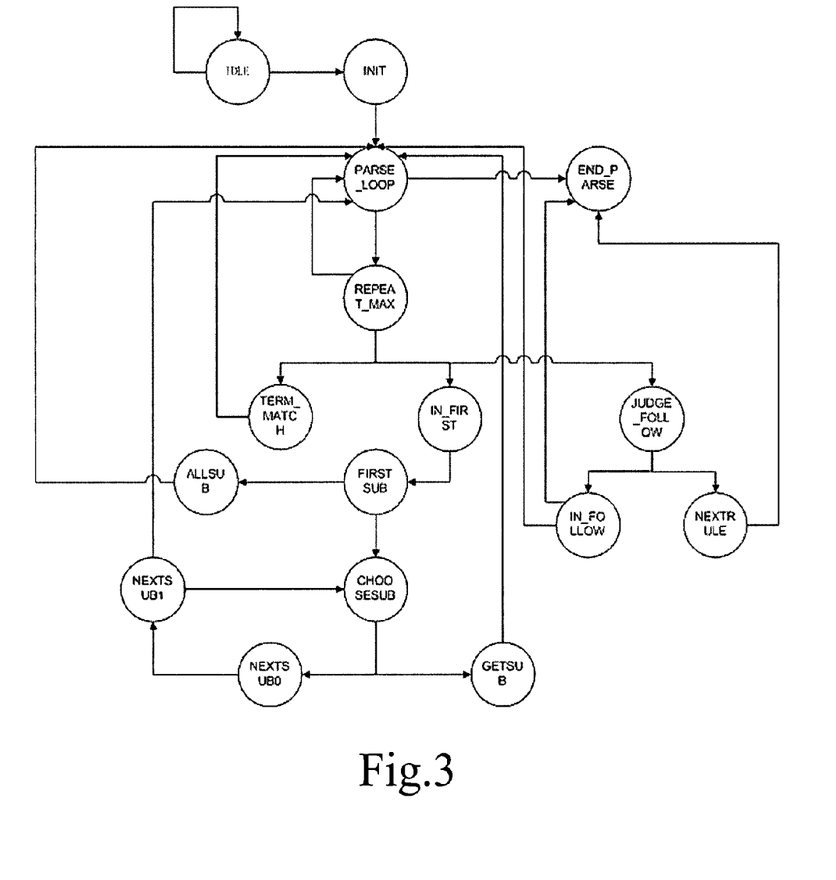
FIG. 3 is a schematic diagram illustrating a state machine of a main_proc processing unit 201 shown in FIG. 2.

FIG. 3 is a schematic diagram illustrating a state machine of the main_proc processing unit 201 shown in FIG. 2.

The main_proc processing unit 201 functions as a main process and is driven by a rising edge of an external clock. The main_proc processing unit 201 includes the following states as shown in FIG. 3:

IDLE, INIT, PARSE_LOOP, REPEAT_MAX, TERM_MATCH, IN_FIRST, FIRSTSUB, ALLSUB, CHOOSESUB, NEXTSUB0, NEXTSUB1, GETSUB, JUDGE_FOLLOW, IN_FOLLOW, NEXTRULE and END_PARSE.

The state transitions of the main_proc processing unit 201 include:

When detecting the rising edge of an external driving signal, the state machine of the main_proc processing unit 201 transfers from the IDLE state to the INIT state to initialize the main_proc processing unit 201, and pushes the root node of the rule-tree into the stack. The stack during the main process stores all the nodes of the rule-tree. After the initialization is performed, the state machine of the main_proc processing unit 201 transfers to the PAESE_LOOP state.

In the PARSE_LOOP state, the main_proc processing unit 201 reads the node one by one from top of the stack to start the parsing of the packet. Each time reading a node, the state machine of the main_proc processing unit 201 transfers to the REPEAT_MAX state once. When there is no unmatched character and the current node is the root node, the state machine of the main_proc processing unit 201 transfers to the END_PARSE state.

In the REPEAT_MAX state, the main_proc processing unit 201 determines whether the match times of the node has reached the REPEAT_MAX; if the match times of the node has reached the REPEAT_MAX, return to the PARSE_LOOP state, and prepare to match the next node; otherwise, determine the type of the top node of the stack and determine to enter a corresponding sub_proc processing unit according to the type of the top node; wherein the stack is used for tracing a parsing progress of the rule-tree. As shown in FIG. 2, the detailed procedure is as follows.

If the top node is a terminative node, i.e. a leaf node of the simplified ABNF rule, set a match_term signal to a high voltage level to initiate the parse_term_proc. If a match_term_result signal changes to the high voltage level, enter into the TERM_MATCH state, and set the match_term signal to a low voltage level to stop the parse_term_proc; returns to the PARSE_LOOP state;

If the top node is a non-terminative node, set a match_first signal to the high voltage level to initiate the match_first_proc process, the detailed processing of the match_first_proc process is as follows:

If a match_first_success signal is at the high voltage level, it indicates that the current character is in the First Terminals Set of the node; the state machine of the main_proc processing unit 201 enters into the FIRSTSUB state and sets the match_first signal to the low voltage level to stop the match_first_proc process, selects and pushes a correct sub-node into the stack and returns to the PARSE_LOOP state according to the First Terminals Set of the sub-node. Specifically, detect each sub-node according to the First Terminals Set of the sub-node; if the content of the current packet exists in the First Terminals Set of a certain sub-node, the state machine of the main_proc processing unit 201 pushes the sub-node into the stack for matching.

In the FIRSTSUB state, the state machine of the main_proc processing unit 201 determines whether there is a sub-node. If there is a sub-node, the state machine of the main_proc processing unit 201 enters into the CHOOSESUB state; otherwise, enters into the ALLSUB state. The ALLSUB state indicates that all sub-nodes have been processed, and the state machine of the main_proc processing unit 201 returns to the PAESE_LOOP state.

In the CHOOSESUB state, the state machine of the main_proc processing unit 201 reads each sub-node in order, and determines whether the sub-node is a correct sub-node according to the First Terminals Set of the sub-node. The purpose of the determination is to improve the efficiency. Otherwise, the state machine of the main_proc processing unit 201 may attempt to match each sub-node until the correct one is found or all attempts are failed; if the sub-node is a correct sub-node, enter into the GETSUB state; otherwise, enter into the NEXTSUB0 state.

In the NEXTSUB0 state, the state machine of the main_proc processing unit 201 reads a next sub-node 0, and determines whether the sub-node is a correct sub-node; if the sub-node is a correct sub-node, enter into the GETSUB state; otherwise, enter into the NEXTSUB1 state.

In the NEXTSUB1 state, the state machine of the main_proc processing unit 201 reads the next sub-node 1, and determines whether the sub-node is a correct sub-node; if the sub-node is a correct sub-node, the state machine of the main_proc processing unit 201 enters into the GETSUB state; otherwise, returns to the PARSE_LOOP state.

In the GETSUB state, the state machine of the main_proc processing unit 201 pushes the sub-node selected into the stack and returns to the PAESE_LOOP state.

If a match_first_fail signal is at the high voltage level, it indicates that the current character is not in the First Terminals Set of the sub-node; the state machine of the main_proc processing unit 201 enters into the JUDGE_FOLLOW state.

In the JUDGE_FOLLOW state, the state machine of the main_proc processing unit 201 sets the match_follow signal to the high voltage level to initiate the match_follow roc process, and waits for a match_follow success signal or a match_follow fail signal to determine whether to match the next sub-node; if a subsequent character is in the Follow Terminals Set of the node, enter into the IN_FOLLOW state; otherwise, enter into the NEXTRULE state.

The NEXTRULE state indicates that the detection of the Follow Terminals Set is failed. It indicates that the packet parsing is failed, i.e., the packet does not meet the ABNF syntax; the state machine of the main_proc processing unit 201 enters into the END_PARSE state to terminate the parsing, and returns a parsing fail signal.

In the IN_FOLLOW state, if the match of the node with the Follow Terminals Set is successful, return to the PAESE_LOOP state, pop out the node from top of the stack and matches a new top node, i.e., the next node.

Figure 4:
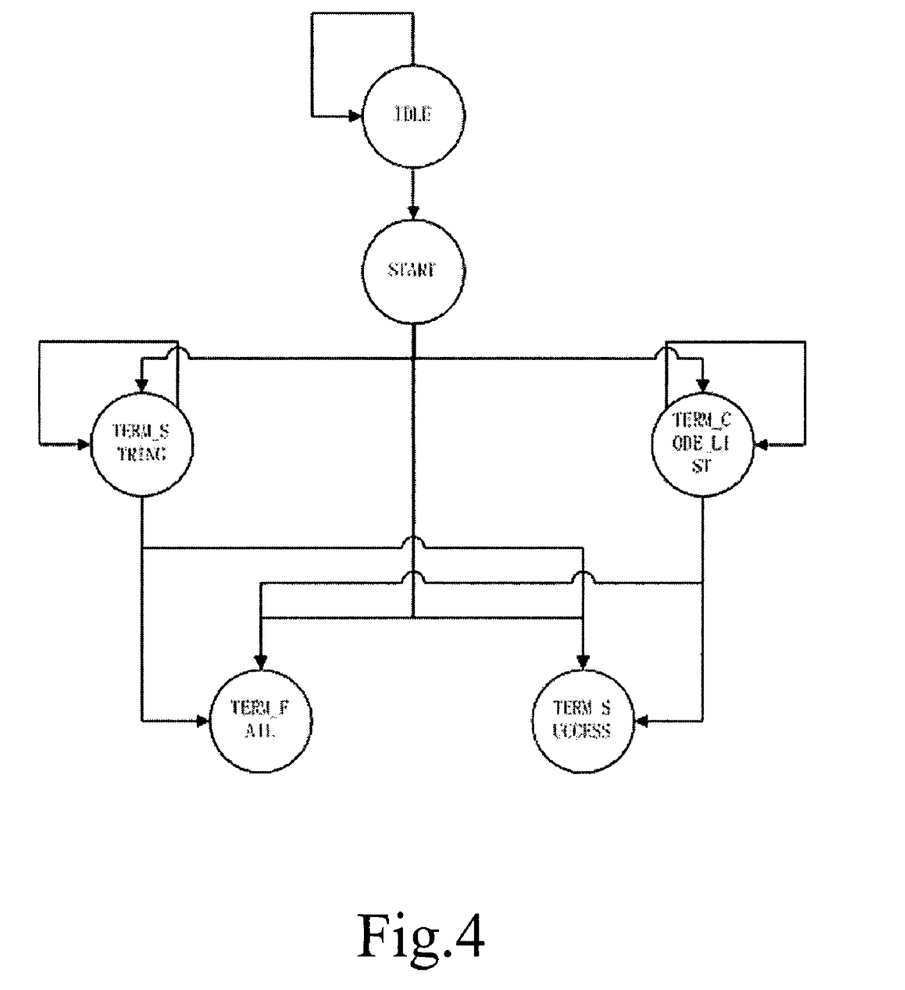
FIG. 4 is a schematic diagram illustrating a state machine of a parse_term_proc processing unit 202 shown in FIG. 2.

FIG. 4 is a schematic diagram illustrating a state machine of the parse_term_proc processing unit 202 shown in FIG. 2. The parse_term_proc processing unit 202 is driven by the rising edge of the clock and is used for matching a terminative node, the corresponding states include:

IDLE, START, TERM_STRING, TERM_CODE_LIST, TERM_SUCCESS and TERM_FAIL.

With reference to FIG. 4, when the match_term signal is set to the high voltage level by the main_proc processing unit 201, the state machine of the parse_term_proc processing unit 202 transfers from the IDLE state to the START state. In the START state, the state machine of the parse_term_proc processing unit 202 reads the packet byte by byte from the on-parsing packet storage module 103, determines an encoding type of the packet, and enters into a corresponding state according to the encoding type of the packet.

If the encoding type of the packet is a string, the state machine of the parse_term_proc processing unit 202 enters into the TERM_STRING state to match every character of the packet; if the string only includes a single character or a range ASCII Codes of a single character, directly determines whether the match is successful, and enters into the TERM_SUCCESS state or the TERM_FAIL state according to the matching result.

If the encoding type of the packet is a code list, the state machine of the parse_term_proc processing unit 202 enters into the TERM_CODE_LIST state to match every single character of the packet.

After the match is completed in the TERM_STRING state or the TERM_CODE_LIST state, the state machine of the parse_term_proc processing unit 202 enters into the TERM_SUCCESS state or the TERM_FAIL state according to the matching result, and sets the term_match_result to the high voltage level to inform the state machine of the main_proc processing unit 201.

When the state machine of the main_proc processing unit 201 sets the match_term to the low voltage level, the state machine of the parse_term_proc processing unit 202 returns to the IDLE state, and clears the term_match_result signal for waiting for the next match.

Figure 5:
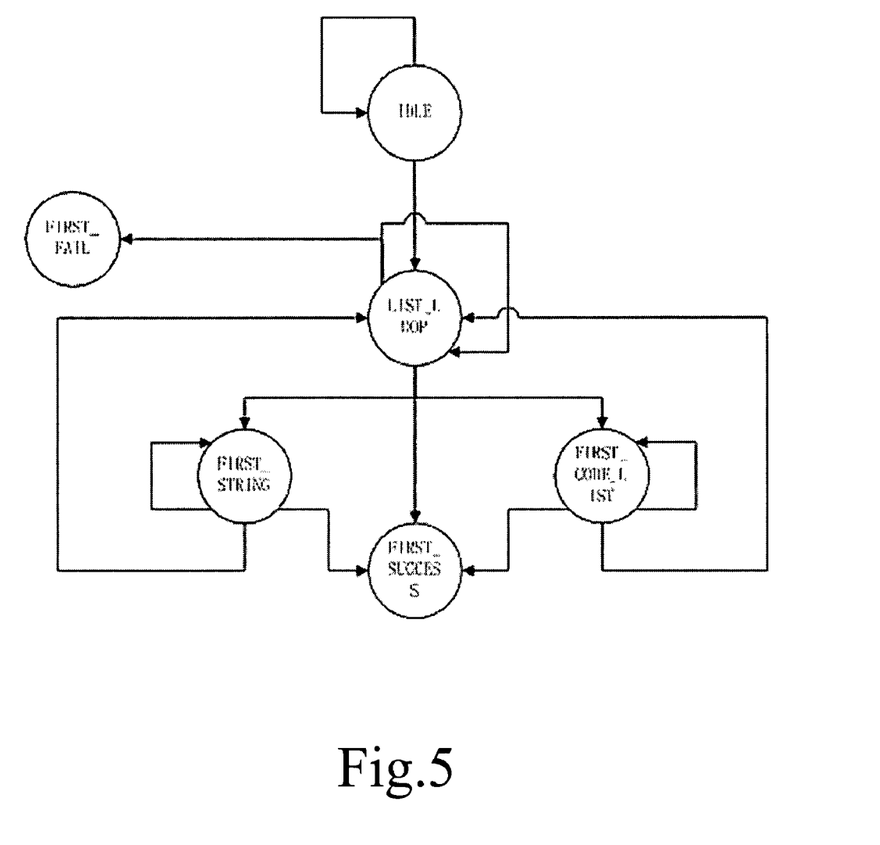
FIG. 5 is a schematic diagram illustrating a state machine of a match_first_proc processing unit 203 shown in FIG. 2.

FIG. 5 is a schematic diagram illustrating a state machine of the match_first_proc processing unit 203 shown in FIG. 2.

The match_first_proc is driven by the rising edge and is used for comparing whether the current character exists in the First Terminals Set of the node. The corresponding states include:

IDLE, LIST_LOOP, FIRST_STRING, FIRST_CODE_LIST, FIRST_SUCCESS and FIRST_FAIL.

With reference to FIG. 5, when the match_first signal is set to the high voltage level by the main_proc, the state machine of the match_first_proc processing unit 203 transfers from the IDLE state to the LIST_LOOP state. In the LIST_LOOP state, the state machine of the match_first_proc processing unit 203 determines the encoding type of the packet, and performs relevant processing according to the encoding type.

If the encoding type of the packet is a string, the state machine of the match_first_proc processing unit 203 enters into the FIRST_STRING state to match every character of the packet.

If the string is a single character or a range ASCII Codes of a single character, directly determine whether the match is successful, and enters into the FIRST_SUCCESS state or the FIRST_FAIL state according to the matching result.

If the encoding type is a code list, the state machine of the match_first_proc processing unit 203 enters into the FIRST_CODE_LIST state to match every character of the packet.

After the match is performed in the FIRST_STRING state, the state machine of the match_first_proc processing unit 203 enters into the FIRST_SUCCESS or the FIRST_FAIL states according to the matching result.

After the match is performed in the FIRST_CODE_LIST state, the state machine of the match_first_proc processing unit 203 enters into the FIRST_SUCCESS state or the FIRST_FAIL state according to the matching result, returns to the LIST_LOOP state to match the content of a next list until finding a matched First Terminals Set element or reaching the end of the list.

If there is no matched First Terminals Set element, the state machine of the match_first_proc processing unit 203 enters into the FIRST_FAIL state; the state machine of the match_first_proc processing unit 203 sets the first_match_success and the first_match_fail to the high voltage level respectively to inform the state machine of the main_proc processing unit 201 in the FIRST_SUCCESS state and the FIRST_FAIL state.

When the state machine of the main_proc processing unit 201 sets the match_first to the low voltage level, the state machine of the match_first_proc processing unit 203 returns to the IDLE state, and clears the match_first_success or match_first_fail signal for waiting for the next match.

Figure 6:
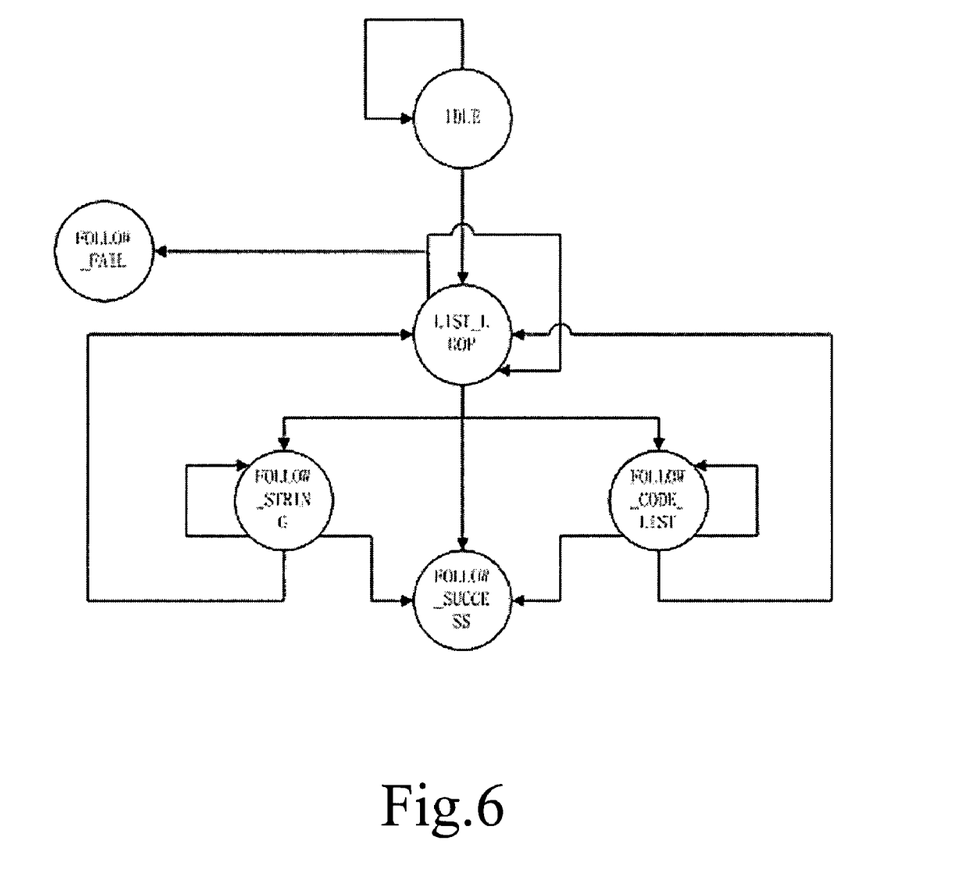
FIG. 6 is a schematic diagram illustrating a state machine of a match_follow_proc processing unit 204 shown in FIG. 2.

FIG. 6 is a schematic diagram illustrating a state machine of the match_follow roc processing unit 204 shown in FIG. 2. The match_follow_proc is driven by the rising edge and is used for determining whether the current character exists in the Follow Terminals Set of the node. The corresponding states include:

IDLE, LIST_LOOP, FOLLOW_STRING, FOLLOW_CODE_LIST, FOLLOW_SUCCESS and FOLLOW_FAIL.

With reference to FIG. 6, when the match_follow signal is set to the high voltage level by the main_proc processing unit 201, the state machine of the match_follow_proc processing unit 204 transfers from the IDLE state to the LIST_LOOP state. In the LIST_LOOP state, the state machine of the match_follow_proc processing unit 204 determines the encoding type of the packet, and performs relevant processing according to the encoding type.

If the encoding type of the packet is a string, the state machine of the match_follow_proc processing unit 204 enters into the FOLLOW_STRING state to match every single character of the packet.

If the string is a single character or a range ASCII Codes of a single character, directly determines whether the match is successful, and enters into the FOLLOW_SUCCESS state or the FOLLOW_FAIL state according to the matching result.

If the encoding type of the packet is a code list, the state machine of the match_follow_proc processing unit 204 enters into the FOLLOW_CODE_LIST state to match every single character of the packet.

After the match is performed in the FOLLOW_CODE_LIST state, the state machine of the match_follow_proc processing unit 204 enters, according to the matching result, into the FOLLOW_SUCCESS state or the FOLLOW_FAIL state, or returns to the LIST_LOOP to match the content of a next list until finding a matched Follow Terminals Set element or reaching the end of the list.

If there is no matched Follow Terminals Set element, the state machine of the match_follow_proc processing unit 204 enters into the FOLLOW_FAIL state, sets the follow_match_success and the follow_match_fail to the high voltage level respectively to inform the state machine of the main_proc processing unit 201 in the FOLLOW_SUCCESS state and the FOLLOW_FAIL state.

When the state machine of the main_proc processing unit 201 sets the match_follow to the low voltage level, the state machine of the match_follow_proc processing unit 204 returns to the IDLE state, and clears the match_follow_success or match_follow_fail signal for waiting for the next match.

Based on the above state machines, the packet parsing module 101 may be implemented by a hardware logic chip such as FPGA or CPLD; so that a universal ABNF syntax based text-coded-protocol parser may be implemented.

The foregoing is only preferred embodiments of the present invention. The protection scope of the present invention, however, is not limited to the above description. Any change or substitution, within the technical scope disclosed by the present invention, easily occurring to those skilled in the art should be covered by the protection scope of the present invention. Therefore, the protection scope of the present invention should be compatible with the protection scope stated by claims.

What is claimed is:

1. A parser for parsing a text-coded protocol, comprising:
a parsing rule storage module, configured to store a parsing rule tree generated according to Augmented Backus-Naur Form (ABNF) rules for parsing a packet of the text-coded protocol; and
a packet parsing module, implemented by a logic chip, configured to parse the packet according to the parsing rule tree stored in the parsing rule storage module, and output a parsing result,
wherein the parsing rule tree comprises no incremental selection, sequence group and optional sequence structure, and wherein the parsing rule tree is generated in a recursion mode by taking one rule in the parsing rule tree as a vertex,
wherein the packet parsing module comprises a main_proc processing unit, configured to control entering of a parse_term_proc processing unit, a match_first_proc, processing unit and a match_follow_proc processing unit respectively according to a type of a top node of a stack;
the parse_term_proc processing unit, configured to be started under the control of the main_proc processing unit if the top node is a terminative node, inform the main_proc processing unit after parsing the packet;
the match_first_proc processing unit, configured to be started under the control of the main_proc processing unit if the top node is a non-terminative node and belongs to a First Terminals Set, and inform the main_proc processing unit after determining whether a current character belongs to the First Terminals Set by matching the current character with all characters of the First Terminals Set;

the match_follow_proc processing unit, configured to be started under the control of the main_proc processing unit if the top node is a non-terminative node and belongs to a Follow Terminals Set, and inform the main_proc processing unit after determining whether the current character belongs to the Follow Terminals Set by matching the current character with all characters of the Follow Terminals Set.

2. The parser of claim 1, wherein the logic chip comprises any one of: a Field Programmable Gate Array (FPGA) and a Complex Programmable Logical Device (CPLD).

3. The parser of claim 1, wherein the main_proc processing unit, the parse_term_proc processing unit, the match_first_proc processing unit and the match_follow_proc processing unit of the packet parsing module are implemented by state machines.

4. The parser of claim 3, wherein the state machine of the main_proc processing unit comprises:
a PARSE_LOOP state, configured to parse the packet;
a REPEAT_MAX state, configured to determine whether the top node of the stack storing the rule-tree is a terminative node;
a TERM_MATCH state, configured to match a terminator and initiate the parse_term_proc processing unit;
an IN_FIRST state, configured to determine a First Terminals Set and initiate the match_first_proc processing unit after determining that the First Terminals Set exists;
an ALLSUB state, configured to be entered when all sub-nodes are processed in the IN_FIRST state and return to the PARSE_LOOP state;
a JUDGE_FOLLOW state, configured to determine a Follow Terminals Set, enter an IN_FOLLOW state after determining that the Follow Terminals Set exists, and initiate the match_follow_proc processing unit; or enter a NEXTRUE state when there exists no Follow Terminals Set, and return to the PARSE_LOOP state if the stack is not null.

5. The parser of claim 3, wherein the state machine of the parse_term_proc processing unit comprises:
a TERM_STRING state, configured to match every single character of a string;
a TERM_CODE_LIST state, configured to match every single character of a code list;
a TERM_SUCCESS state, configured to inform a match success result to the main_proc processing unit; and
a TERM_FAIL state, configured to inform the main_proc processing unit of a match failure result.

6. The parser of claim 3, wherein the state machine of the match_first_proc processing unit comprises:
a LIST_LOOP state, configured to determine whether an encoding type of a packet is a string or a code list;
a FIRST_STRING state, configured to match every single character of the string;
a FIRST_CODE_LIST state, configured to match every single character of the code list;
a FIRST_SUCCESS state, configured to inform the main_proc processing unit of a match success result; and
a FIRST_FAIL state, configured to inform the main_proc processing unit of a match failure result.

7. The parser of claim 3, wherein the state machine of the match_follow_proc processing unit comprises:
a LIST_LOOP state, configured to determine whether an encoding type of a packet is a string or a code list;
a FOLLOW_STRING state, configured to match every single character of the string;
a FOLLOW_CODE_LIST state, configured to match every single character of the code list;
a FOLLOW_SUCCESS state, configured to inform the main_proc processing unit of a match success result; and
a FOLLOW_FAIL state, configured to inform the main_proc processing unit of a match failure result.

8. The parser of claim 1, further comprising:
an on-parsing packet storage module, configured to store the packet to be parsed; and
the packet parsing module is further configured to read the packet from the on-parsing packet storage module for parsing.

9. The parser of claim 1, further comprising:
a parsing result storage module, configured to store a parsing result after the parsing of the packet parsing module is performed.

10. The parser of claim 8, further comprising:
a parsing result storage module, configured to store a parsing result after the parsing of the packet parsing module is performed.

* * * * *

UNITED STATES PATENT AND TRADEMARK OFFICE
CERTIFICATE OF CORRECTION

PATENT NO. : 7,636,787 B2  Page 1 of 1
APPLICATION NO. : 11/878191
DATED : December 22, 2009
INVENTOR(S) : Baohua Zhao et al.

It is certified that error appears in the above-identified patent and that said Letters Patent is hereby corrected as shown below:

Column 8, line 43, replace the text "rule tree" with the text "rule-tree";
Column 8, line 44, replace the text "Naur Form" with the text "Naur-Form";
Column 8, line 48, replace the text "rule tree" with the text "rule-tree";
Column 8, line 50, replace the text "rule tree" with the text "rule-tree";
Column 8, line 52, replace the text "rule tree" with the text "rule-tree";
Column 8, line 57, delete the comma "," after the text "a match_first_proc".

Signed and Sealed this

Ninth Day of March, 2010

David J. Kappos
*Director of the United States Patent and Trademark Office*